US007689823B2

(12) United States Patent
Shen et al.

(10) Patent No.: US 7,689,823 B2
(45) Date of Patent: *Mar. 30, 2010

(54) CONTENT DISTRIBUTION/PROTECTING METHOD AND APPARATUS

(75) Inventors: Sheng Mei Shen, Singapore (SG); Ming Ji, Singapore (SG); Takanori Senoh, Hirakata (JP); Takuyo Kogure, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1283 days.

This patent is subject to a terminal disclaimer.

(21) Appl. No.: 10/297,622

(22) PCT Filed: Feb. 26, 2002

(86) PCT No.: PCT/JP02/01698

§ 371 (c)(1),
(2), (4) Date: Mar. 24, 2003

(87) PCT Pub. No.: WO02/071752

PCT Pub. Date: Sep. 12, 2002

(65) Prior Publication Data

US 2003/0149890 A1 Aug. 7, 2003

(30) Foreign Application Priority Data

Mar. 2, 2001 (JP) ............................. 2001-058236
Dec. 14, 2001 (JP) ............................. 2001-381406

(51) Int. Cl.
*H04L 29/06* (2006.01)
(52) U.S. Cl. .................................................... 713/153

(58) Field of Classification Search .................. 705/51, 705/57, 59; 380/20, 28, 33, 239, 255
See application file for complete search history.

(56) References Cited

U.S. PATENT DOCUMENTS

| 5,144,665 | A | 9/1992 | Takaragi et al. |
| 6,026,164 | A | 2/2000 | Sakamoto et al. |
| 6,353,892 | B2 | 3/2002 | Schreiber et al. |
| 6,535,919 | B1 | 3/2003 | Inoue et al. |
| 6,785,704 | B1 * | 8/2004 | McCanne ................ 718/105 |

(Continued)

FOREIGN PATENT DOCUMENTS

EP 766471 4/1997

(Continued)

OTHER PUBLICATIONS

Ming Ji et al, "MPEG 4 IPMP Extension," EURASIP JASP, 2004.*

(Continued)

*Primary Examiner*—Pramila Parthasarathy
(74) *Attorney, Agent, or Firm*—Greenblum & Bernstein P.L.C.

(57) ABSTRACT

A method for appropriately defining standards for implementing an MPEG-n intellectual property management and protection (IPMP) system introduces IPMP Tool Information located at the beginning of the content stream, and an IPMP Tool management function as a pre-processing module located at the start of the content decoder, and retrieves IPMP Tools based on the IPMP Tool Information. To improve security and enable interoperability between terminals in different IPMP systems, a two-layer security structure and user authentication output format are further defined. Implementation on terminals of different complexity is enabled by further defining different profiles for IPMP Tool retrieval.

22 Claims, 7 Drawing Sheets

U.S. PATENT DOCUMENTS

| | | | |
|---|---|---|---|
| 6,859,791 B1 * | 2/2005 | Spagna et al. | 705/51 |
| 6,922,777 B1 | 7/2005 | Iwamura | |
| 6,931,541 B1 | 8/2005 | Nakagawa | |
| 6,938,028 B1 | 8/2005 | Ito | |
| 7,177,841 B2 * | 2/2007 | Inoue et al. | 705/51 |
| 7,308,717 B2 * | 12/2007 | Koved et al. | 726/27 |
| 2001/0053222 A1 | 12/2001 | Wakao et al. | |
| 2003/0110130 A1 * | 6/2003 | Pelletier | 705/50 |
| 2003/0163430 A1 | 8/2003 | Takaku | |
| 2004/0054892 A1 | 3/2004 | Ji et al. | |
| 2004/0202328 A1 | 10/2004 | Hara | |
| 2005/0010653 A1 * | 1/2005 | McCanne | 709/219 |
| 2005/0244004 A1 | 11/2005 | Nakagawa | |

FOREIGN PATENT DOCUMENTS

| | | |
|---|---|---|
| EP | 0913997 | 5/1999 |
| EP | 957606 | 11/1999 |
| EP | 969668 | 1/2000 |
| EP | 0969668 | 1/2000 |
| EP | 1041819 | 10/2000 |
| EP | 1079627 | 2/2001 |
| JP | 8-331543 | 12/1996 |
| JP | 8331543 | 12/1996 |
| JP | 1051778 | 2/1998 |
| JP | 1051779 | 2/1998 |
| JP | 10-257046 | 9/1998 |
| JP | 10257046 | 9/1998 |
| JP | 11-331310 | 11/1999 |
| JP | 11331310 | 11/1999 |
| JP | 2000-83022 | 3/2000 |
| JP | 200083022 | 3/2000 |
| JP | 2000-101853 | 4/2000 |
| JP | 2000101853 | 4/2000 |
| JP | 2000-156697 | 6/2000 |
| JP | 2000-287067 | 10/2000 |
| JP | 2000-287206 | 10/2000 |
| JP | 2000-293945 | 10/2000 |
| JP | 2000287206 | 10/2000 |
| JP | 1079627 | 2/2001 |
| JP | 200178007 | 3/2001 |
| JP | 2001359070 | 12/2001 |
| WO | 99/48296 | 9/1999 |
| WO | 01/91052 | 11/2001 |
| WO | 02071752 | 9/2002 |
| WO | 02100037 | 12/2002 |

OTHER PUBLICATIONS

Ken Dawson, "MPEG 4: A Bird's Eye View," Hello World, Apr. 1999.*
Overview of the MPEG 4 Standard, Rob Koenen, International 1 Organisation for Standardisation Organisation Internationale De Normalisation ISO/IEC JTC1/SC29/WGI 1 Coding of Moving Pictures and Audio, ISO/IEC JTC1/SC29/WG11 N3342, Mar. 2000.*
Rob Koenen, "Intellectual Property Management and Protection in MPEG Standards," Jan. 2001.*
English Language Abstract of JP 2000-83022.
English Language Abstract of JP Appln. No. 2000-83022.
English Language Abstract of JP Appln. No. 2000-287206.
English Language Abstract of JP Appln. No. 10-257046.
English Language Abstract of JP Appln. No. 11-331310.
English Language Abstract of JP Appln. No. 8-331543.
English Language Abstract of JP Appln. No. 2000-101853.
English Language Abstract of JP Appln. No. 10-51778.
English Language Abstract of JP Appln. No. 10-51779.
English Language Abstract of JP Appln. No. 2001-78007.
English Language Abstract of JP Appln. No. 2001-359070.
"Electronics", No. 554; Nippon, Chmu Sha, Jul. 1, 2000, pp. 51-54.
B.J. Van Rijnsoever et al., Interoperable Content Protection for Digital TV, which was published on Jul. 30, 2000.
"DVB: Call for Proposals for Content Protection and Copy Management Technologies," which was downloaded from www.cptwg.org/Assets/DVB-CPT-CfP_rev1.2.PDF on Feb. 10, 2003.
R. Koenen, "Intellectual Property Management and Protection in MPEG Standards," which was downloaded from www.cselt.it/mpeg/standards/ipmp on Sep. 24, 2001.
English language Abstract of JP 2000-156697.
English language Abstract of JP 2000-293945.
English language Abstract of JP 2000-287067.
English language Abstract of JP 2000-287206.
English language Abstract of JP 10-257046.
English language Abstract of JP 11-331310.
English language Abstract of JP 8-331543.
English language Abstract of JP 2000-101853.
McGinty M: "Working Draft 2.0 of ISO/IEC 14496-1:2000/AMD3:2000(E)", ISO/IEC JTC1/SC29/WG11, No. N3871, Jan. 24, 2001, XP002414848.

* cited by examiner

CONTENT DISTRIBUTION/PROTECTING METHOD AND APPARATUS

TECHNICAL FIELD

The present invention relates generally to content distribution and protection, and relates more particularly to an application enabling protected content to be used by a different intellectual property management and protection (IPMP) system, and identical content to be protected by different IPMP systems.

BACKGROUND ART

As on-demand transmission of multimedia data and content at a desired time to a desired place has become possible, demand for such content distribution continues to rise. Users are generally satisfied with the convenience and flexibility of such content distribution, and enjoy being able to view and listen to the desired entertainment content simply and efficiently. As content owners have moved to address customer demand for such content distribution they are naturally concerned about the illegal use and distribution of their intellectual property. It is therefore necessary to balance the needs of content owners with the demands of content users.

Numerous technologies are available for content protection, including data encryption and digital watermarks. Different systems may use different mechanisms and protection technologies to distribute content securely. This means that terminals and content readers designed for use with a particular content protection technology can only playback or use content provided by a content provider using the same technology or method. In order to playback content from a different provider, it is necessary to change the terminal or device.

The MPEG standards group is working to develop standards for an IPMP system including a compliant terminal. All terminals can playback protected content encrypted and protected according to the same IPMP standard regardless of what IPMP tools are used. Such terminals have content decoders such as audio and video decoders, and the terminal can unlock the protection of protected content before decoding and reproducing the content. The protection information, that is, the IPMP tool information, must therefore be known and available to the terminal.

On the other hand the IPMP tools cannot be limited to specific predetermined tools because vendors need the flexibility to select the preferred tools for their own IPMP system. It is therefore necessary to define a standard method and interface enabling improvements in both flexibility and security.

Different vendors may use quite different implementations for user authentication and IPMP tool retrieval according to the prior art even though they use the same content decoder, such as MPEG-2 or MPEG-4. This makes it very difficult for any single terminal to playback different content provided by multiple different content providers. In other words, the same protected content cannot be played back on different IPMP systems.

The present invention is directed to solving this problem and an object of our invention is to define a single intellectual property management and protection system enabling protected content to be used on different IPMP systems.

A further object of this invention is to provide a standard method enabling IPMP system implementers to build a secure system encompassing the encoder, channel distribution, and terminal.

DISCLOSURE OF INVENTION

To achieve this object the invention first defines the IPMP tool information stored in addition to a content identifier in a specific single packet at the beginning of the actual content stream. This IPMP tool information packet contains the following information:
 type of IPMP tool used for content protection;
 IPMP tool location type;
 location from where the IPMP tool can be retrieved.

The IPMP Tool Information flag is stored as the header at the beginning of the packet. An IPMP Tool management function is designed as a single module disposed at the front of the content decoder to read and parse IPMP Tool Information carried in the content stream and retrieve the IPMP Tool for unlocking content stream protection.

A two-layer security structure is introduced to improve security and determine the output conditions for different user authentication methods in order to provide compatibility with different terminals. IPMP Tool identifiers (ID) are defined in a specific table, and the table is either pre-encoded and stored locally or can be downloaded to the terminal. Both the content provider and the terminal must refer to the same table to use the same IPMP Tool ID for the same IPMP Tool.

The terminal can be pre-encoded using an existing IPMP Tool as a standard IPMP Tool. If the terminal is able, it can alternatively download a proprietary IPMP Tool based on IPMP Tool Information carried in the content stream. The encryption key is further encrypted based on the two-layer security structure and inserted to the IPMP data field so that it can be sent to the terminal with the content stream. Content is encoded at the content provider side using a known encoding method such as MPEG-2 or MPEG-4, and encrypted using a known IPMP Tool such as DES or AES. A digital watermark could also be embedded in the content before encoding.

The Content ID is generated based on such information as the content copyright data and content creation data. The IPMP Tool Information is generated based on the IPMP Tool Information used to protect the content. The IPMP Tool Information includes an IPMP Tool ID, location type, and IPMP Tool location. The data stream starts with an IPMP Tool Information flag followed by the IPMP Tool Information, Content ID, and the content.

Any terminal can retrieve and reference this content, but playback is impossible without an appropriate user license and corresponding or correct IPMP Tool. At the terminal side the content stream passes through the IPMP Tool management function module, and the IPMP Tool is retrieved after local or remote IPMP Tool authentication. The retrieved IPMP Tool can be used by the terminal at this point.

As the content stream continues to flow through the content decoder, the IPMP data decoder module activates the user authentication module, and sends a user authentication request to the content provider by supplying the user terminal ID, Content ID, and IPMP Tool ID. A user license is issued to the requesting terminal when user authentication is successfully completed. Finally, the encrypted key is decrypted, the encoded content is decrypted and decoded, and the content can then be played back.

By inserting an IPMP Tool Information packet at the start of the content stream, and introducing an IPMP Tool management function module for parsing the IPMP Tool Information and retrieving the IPMP Tool, our invention solves the problem of enabling the same protected content to be played back on a different type of IPMP system.

A two-layer security structure not only improves security, it also fixes the output structure of different user authentication methods and thus enables compatibility between terminals. This security structure enables user authentication to be implemented with different methods for different vendors, and provides compatibility between different systems. Different characteristics are defined with consideration for flexibility and the complexity of the terminal for retrieving IPMP Tools, and cover a wide range so that different terminals can use the same standard.

Other objects and attainments together with a fuller understanding of the invention will become apparent and appreciated by referring to the following description and claims taken in conjunction with the accompanying drawings.

BEST MODE FOR CARRYING OUT THE INVENTION

Figure 1:
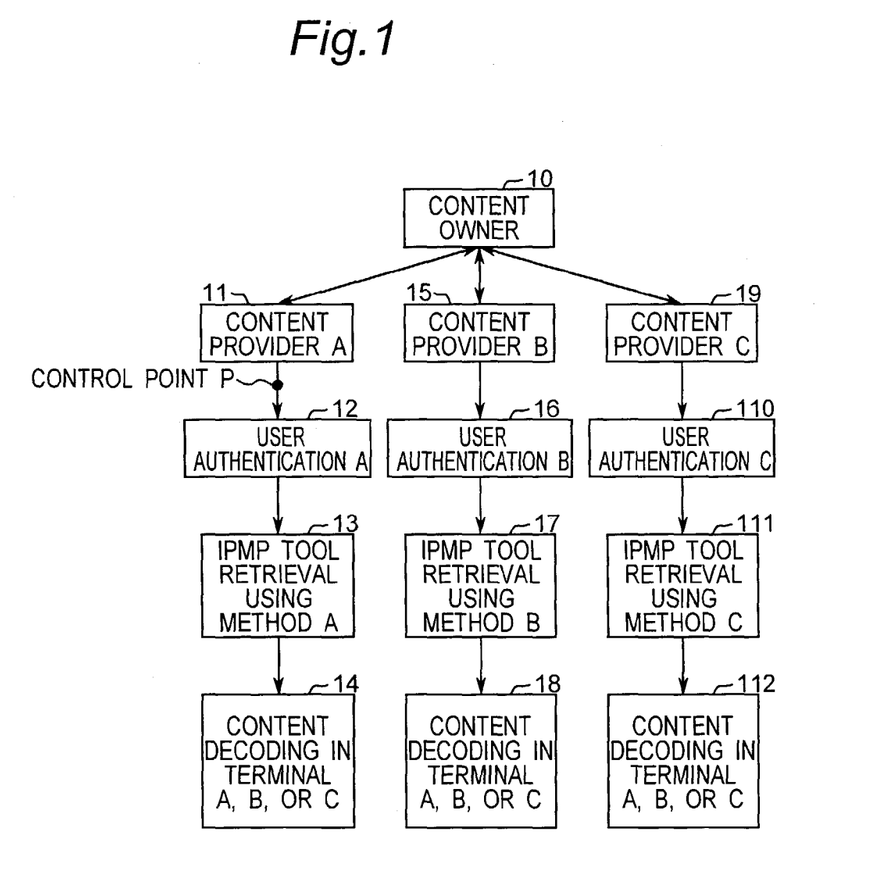
FIG. 1 shows an IPMP system for content distribution and protection according to the present invention.

Preferred embodiments of the present invention are described below with reference to the accompanying figures. FIG. 1 shows an IPMP system for content distribution and protection according to the present invention.

The content owner 10 makes content available through different content providers A 11, B 15, and C 19. Each of the three content providers A 11, B 15, and C 19 runs a different IPMP system implementation. How to retrieve and authenticate the IPMP Tools is selected from a common IPMP Tool table, and common or different user authentication tools are used. User authentication methods A 12, B 16, and C 110 can be the same method or different methods. The IPMP Tool retrieval methods A 13, B 17, and C 111 are the respective methods selected from a common IPMP Tool table.

The content decoding or content usage terminal can therefore retrieve the necessary IPMP Tool from a common table whether the terminal is type A 14, B 18, or C 112. Terminal A can retrieve the IPMP Tool used by content provider type B from a common table for protected content distributed by content provider type B, and can playback the content using the retrieved IPMP Tool. The IPMP Tool as used herein refers particularly to a decryption tool for encrypted content and a tool for reading digital watermarks embedded in the content, but could also include a reading tool for authentication and a financial transaction processing tool.

It will be noted that with the prior art method protected content distributed by content provider B can only be played back by a terminal B having a service contract with content provider B, and cannot be played back on terminals A and C, which do not have a service contract with content provider B. Our invention, however, enables protected content distributed by content provider B to be played back by terminals A and C, that is, terminals that do not have a service contract with content provider B, as well as by terminal B, a terminal with a service contract with content provider B.

To provide this content distribution system, an apparatus according to the present invention for distributing content from a content provider includes: an encoder for coding and converting content to a content stream; an encryption unit for encrypting the encoded content stream using a data encryption tool; a Content ID generator for generating a specific Content ID according to the content; an IPMP (intellectual property management and protection) Tool Information generator for generating IPMP Tool Information containing the information needed to decrypt a content stream encrypted by the data encryption tool; an IPMP Tool Information flag generator for generating the IPMP Tool Information flag indicating the presence of IPMP Tool Information; and a data stream compiler for building the data stream from the IPMP Tool Information flag and the following IPMP Tool Information, Content ID, and encrypted content stream.

A terminal apparatus according to the present invention for receiving a data stream including content from a content provider and reading the content from the data stream includes: a parser for parsing the data stream; means for detecting the IPMP Tool Information flag, Content ID, and IPMP Tool Information; and means for retrieving an IPMP Tool based on the detected IPMP Tool Information.

These apparatuses are described in further detail below.

Figure 2:
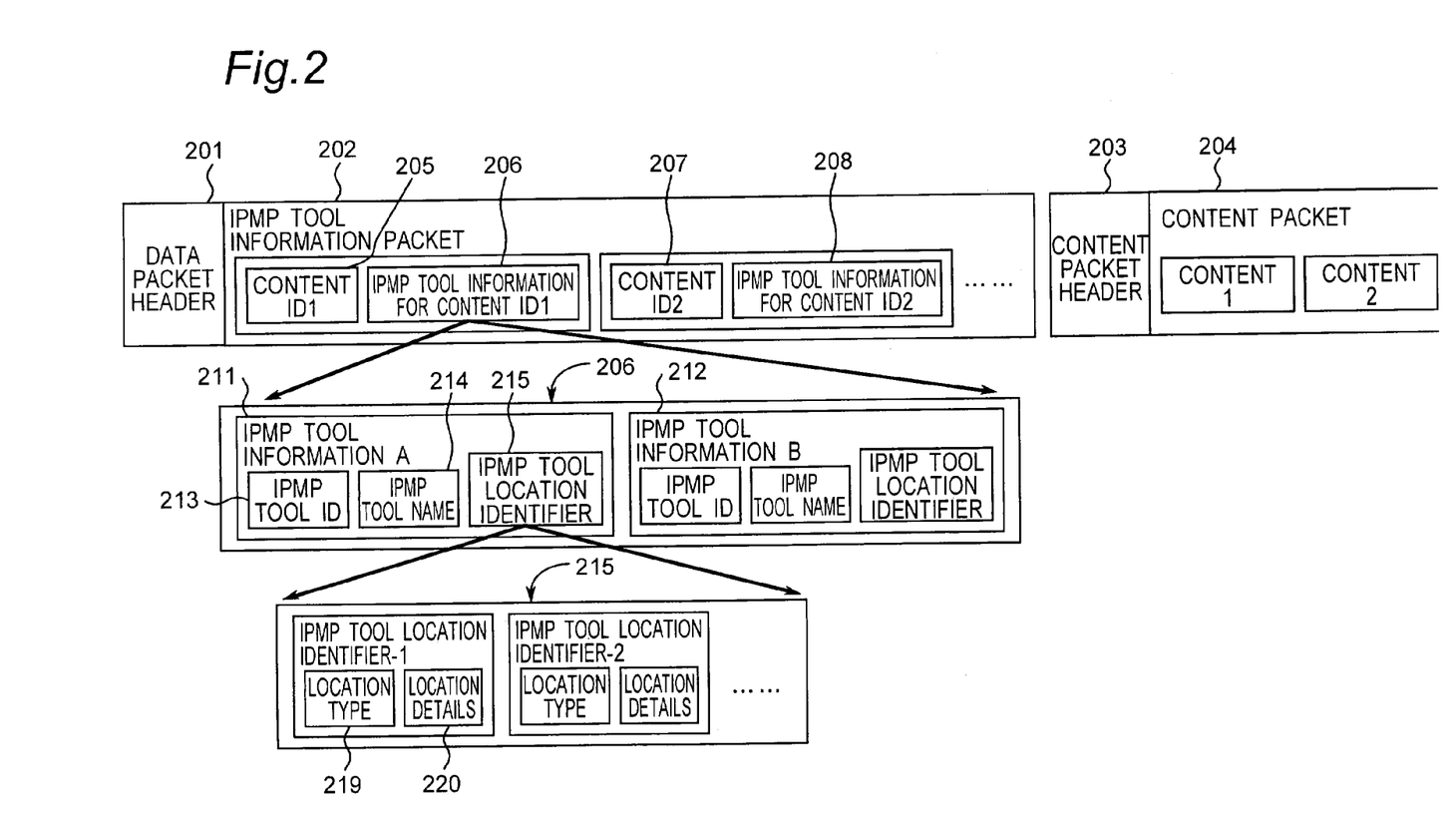
FIG. 2 shows the structure of the IPMP Tool Information packet located at the beginning of the content stream.

The first row in FIG. 2 shows the structure of the data stream passing point P in FIG. 1, and represents the data stream compiled by content provider A. This data stream starts with a data packet header 201 followed by the IPMP Tool Information packet 202. A content packet header 203 follows next and is followed by a content packet 204.

The data packet header 201 or IPMP Tool Information packet 202 stores the IPMP Tool Information flag indicating the presence of IPMP Tool Information. The IPMP Tool Information flag could be stored at some other place in the data stream, such as somewhere in content packet header 203 or content packet 204.

The IPMP Tool Information packet 202 stores one or more pairs of Content ID and Content ID IPMP Tool Information. Note that two pairs are shown in FIG. 2. The first pair contains Content ID1 205 and IPMP Tool Information 206 for Content ID1 205. The second pair contains Content ID2 207 and IPMP Tool Information 208 for Content ID2 207. Content 1 of content packet 204 contains the content (such as Music 1) for the first pair identified by Content ID1 205, and content 2 contains the content (such as Music 2) for the second pair identified by Content ID2 207. Note that different data encryption tools could be used for content 1 and content 2.

The second row in FIG. 2 shows the structure of the IPMP Tool Information 206 for Content ID1 205. IPMP Tool Information for a plurality of content providers is assumed to be included. In the example shown here there is IPMP Tool Information 211 for content provider A, and IPMP Tool Information 212 for content provider B. It will also be obvious that additional IPMP Tool Information for content providers C and D could also be included.

The IPMP Tool Information for content provider A includes IPMP Tool ID 213, IPMP Tool Name 214, and IPMP Tool location identifier 215. The IPMP Tool ID 213 identifies, for example, the decryption tool for decrypting encrypted data. The IPMP Tool name 214 is the name of the decryption tool. The IPMP Tool location identifier 215 indicates the location from where the decryption tool can be retrieved from (such as the URL of a an Internet web site). The IPMP Tool name 214 can be omitted. Each end-user terminal stores Table 1 described further below, and the IPMP Tool name 214 can therefore be retrieved from the Table 1 once the IPMP Tool ID 213 is known.

The IPMP Tool ID 213 is identified by an 8-bit ID code as shown in Table 1, and these ID codes are used in common by all of the terminals. A web site address, for example, is written to the IPMP Tool location identifier 215 as further described below.

The third row in FIG. 2 shows the content of the IPMP Tool location identifier 215 in further detail. Each IPMP Tool location identifier 215 contains the information needed to retrieve the tool program identified by the IPMP Tool name 214, and more specifically contains the location type 219 and location details 220. The location type 219 indicates the type of medium used to store the IPMP Tool, such as the Internet, and the location details 220 contain the specific location from which the tool can be retrieved, such as the URL of a web site.

Figure 3:
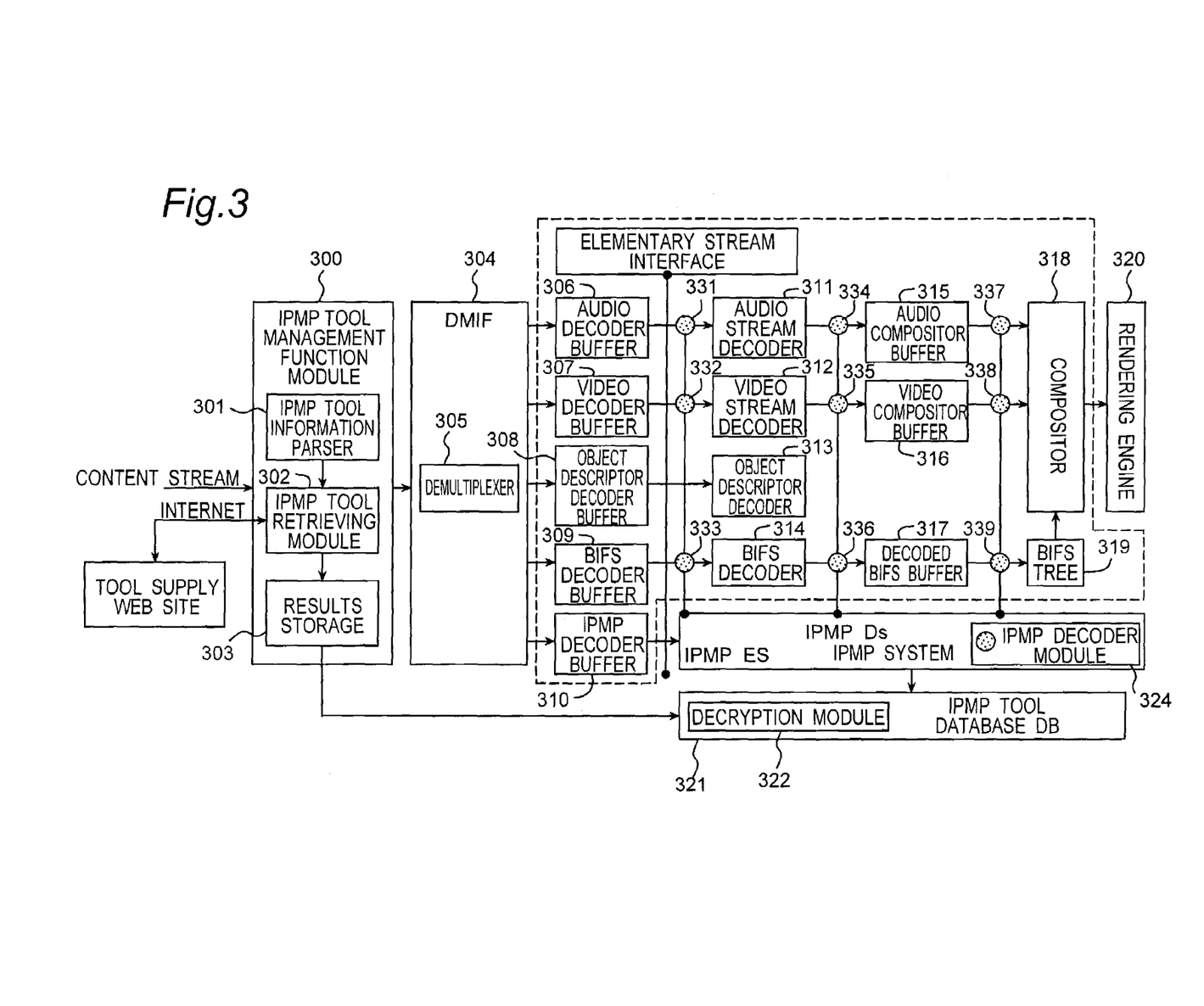
FIG. 3 shows how the IPMP Tool management function works with an MPEG-4 IPMP system.

FIG. 3 shows the configuration of a terminal A. This terminal A has an IPMP Tool management function module 300 for receiving external inputs. The IPMP Tool management function module 300 includes an IPMP Tool Information parser 301, IPMP Tool retrieving module 302, and results storage 303. The results storage 303 is connected to IPMP Tool database 321. The data for Table 1 and the retrieved IPMP Tool software are stored to IPMP Tool database 321. The IPMP Tool database 321 also contains a decryption module 322 for decoding the encryption key. The IPMP Tool management function module 300 is connected to demultiplexer interface 304. The demultiplexer interface 304 is connected to a demultiplexer 305.

Downstream from the demultiplexer interface 304 are an audio decoder buffer 306, video decoder buffer 307, object descriptor decoder buffer 308, BIFS (BInary Format for Scenes) decoder buffer 309, and an IPMP decoder buffer 310. The BIFS signal contains data indicating the locations of scene segments. The audio, video, and BIFS signals output from the audio decoder buffer 306, video decoder buffer 307, and BIFS decoder buffer 309 are still encrypted.

The audio decoder buffer 306 is connected to audio stream decoder 311 through control point 331. The video decoder buffer 307 is connected to video stream decoder 312 through control point 332. The object descriptor decoder buffer 308 is connected directly to the object descriptor decoder 313. The BIFS decoder buffer 309 is connected through control point 333 to BIFS decoder 314. The IPMP decoder buffer 310 is connected to IPMP system 324. Note that the control points 331 to 339 shown as shaded circles in the figure are IPMP control points, and data passing a control point is processed as necessary (for descrambling, watermark detection, or copyguard protection, for example) using tools resident in the IPMP system 324.

In this exemplary embodiment of the invention the data is descrambled at control points 331, 332, 333. The tool (software application) needed for descrambling is retrieved from the IPMP system 324 (including the IPMP Tool database 321).

The audio stream decoder 311 is connected through control point 334 to audio compositor buffer 315. The video stream decoder 312 is connected through control point 335 to video compositor buffer 316. The BIFS decoder 314 is connected through control point 336 to decoded BIFS buffer 317.

In this exemplary embodiment of the invention watermark detection is applied at control points 334, 335, 336. The tools (software) required for watermark detection are retrieved from the IPMP system 324 (including the IPMP Tool database 321).

The audio compositor buffer 315 is connected through control point 337 to compositor 318, the video compositor buffer 316 is likewise connected through control point 338 to compositor 318, and the decoded BIFS buffer 317 is connected through control point 339 and BIFS tree 319 to compositor 318. The compositor 318 is in turn connected and outputs to rendering engine 320.

In this preferred embodiment of the invention another watermark detection and copyguard process are applied at control points 337, 338, 339. The tool (software application) needed for watermark detection and copyguard processing is retrieved from the IPMP system 324 (including the IPMP Tool database 321).

The content stream, such as an MPEG-4 stream, shown in FIG. 2 is input to the IPMP Tool management function module 300, and the IPMP Tool Information packet 202 is detected from the data packet header 201 and input to the IPMP Tool Information parser 301. The content packet 204 detected from the content packet header 203 is passed on to the demultiplexer interface 304. The detected IPMP Tool Information packet 202 is then parsed by the IPMP Tool Information parser 301 to identify the content provider that is the distribution source for the content stream.

If the content provider is provider A, the IPMP Tool Information A 211 used by content provider A is read by the IPMP Tool retrieving module 302. If the content provider is provider B, the IPMP Tool Information B 212 used by content provider B is read. The read result is then buffered to results storage 303 and stored in IPMP Tool database 321.

The content packet 204 passed on to the demultiplexer interface 304 is then demultiplexed into the component audio, video, object descriptor, BIFS, and IPMP signals, and the demultiplexed signals are passed to respective processing circuits. The signals are then processed as described above.

The invention is described in further detail below in four parts.

1. IPMP Tool Information and IPMP Tool Management Function

IPMP Tool Information and the IPMP Tool management function are described next and are defined as follows.

IPMP Tool Information is generally defined as "information that a given IPMP Tool requires to correctly process given protected content."

An IPMP Tool is defined as "modules that perform IPMP functions such as authentication, encryption, and watermarking in a pre-defined way." An IPMP Tool can perform one or more IPMP functions. An IPMP Tool can coordinate operation of other IPMP Tools.

The present invention proposes to further define IPMP Tool Information as "information that the IPMP Tools management function needs to identify and retrieve an IPMP Tool, including unique IPMP Tool identifiers, IPMP Tool location identifier, and the correlation between IPMP Tool and Content ID. IPMP Tools Information should be in the first packet of the entire content stream."

The present invention also proposes to further define the IPMP Tool management function as "an entity whose only function is to process IPMP Tool Information and to retrieve IPMP Tools that are necessary to use the entire content stream. The IPMP Tool management function should be located before the content decoder."

2. IPMP Tool Information

As per the IPMP Tool Information definition, the IPMP Tool Information should be written to the first packet of the entire content stream. The structure of this packet is shown in detail in FIG. 2. The IPMP Tool Information packet should contain all IPMP Tool Information needed to use the protected content. If the content stream contains plural content types, such as when a first part of the content is supplied from content provider A and a second part is supplied by content provider B, the information associated with these different IPMP Tools should be grouped by Content ID.

Figure 7:
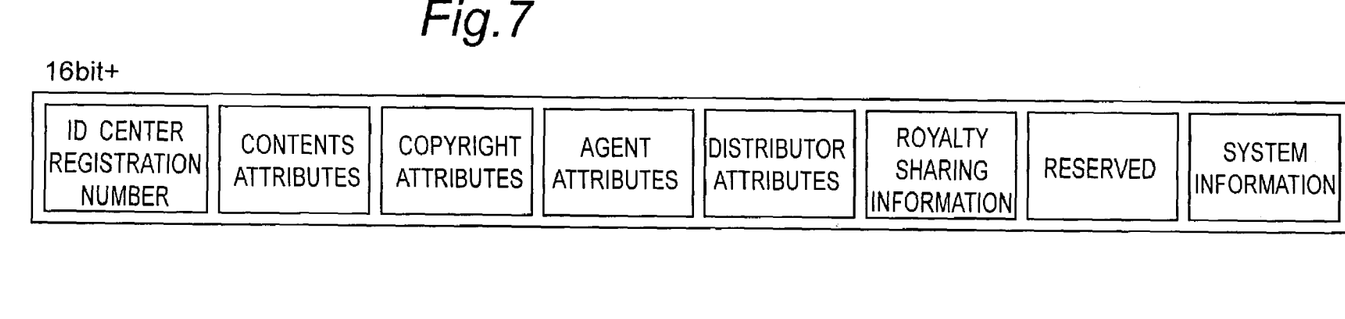
FIG. 7 shows the format of an 8-block Content ID.

The Content ID forum (cIDf) defines the 8-block Content ID format shown in FIG. 7. Referring to FIG. 7, the content attribute block contains author and content information, and the copyright attribute block contains information about copyright ownership. Various Content IDs, including the content owner ID, content copyright owner ID, and recording device ID, should be allocated to respectively specified attribute blocks. Commercial content creators can compile this complex Content ID code stream in various combinations as appropriate.

The IPMP Tool Information for a particular Content ID thus contains particular IPMP Tool Information blocks as described above, and the order of those attribute blocks in the IPMP Tool Information packet is not important. Each IPMP Tool Information entry contains two important parts: the IPMP Tool ID and the IPMP Tool location identifier as noted above. The IPMP Tool ID identifies a particular IPMP Tool in an unambiguous way, and can be defined or pre-stored in the terminal or downloaded to the terminal. An example of an IPMP Tool ID table showing a list of usable IPMP Tool IDs is shown as Table 1 below.

TABLE 1

Usable IPMP Tool IDs

| Tool Function | IPMP Tool ID | IPMP Tool Name | Notes |
| --- | --- | --- | --- |
| Decryption Tool | 000 00000 | DESDecrypt | 5 bits; allows 32 different tools |
| | 000 00001 | AESDecrypt | |
| | 000 00010 | SC2000Decrypt | |
| | 000 00011 | CamelliaDecrypt | |
| | 000 00100 | xxxx | |
| | 000 00101 | xxxx | |
| | 000 00110 | xxxx | |
| | 000 00111 | xxxx | |
| | 000 01000 | xxxx | |
| | 000 0xxxx | xxxx | |
| | 000 0xxxx | xxxx | |
| | 000 10000 | Reserved | Reserved for future or proprietary tools |
| | 000 10001 | Reserved | |
| Watermark Embedding Tool | 001 00000 | Spatial Domain | Need to collect and classify dominant tools |
| | 001 00001 | Frequency domain | |
| | 001 00010 | xxxx | |
| | 001 00011 | xxxx | |
| | 001 00100 | xxxx | |
| | 001 0xxxx | | |
| | | Reserved | Reserved for future or proprietary tools |
| | | Reserved | |

Note that the first three bits can be used for categorizing the IPMP Tool for encryption or watermarking, for example.

The IPMP Tool name is a name used by the IPMP Tool management function for storing a retrieved IPMP Tool, and can be read from the loaded table. The Location Identifier indicates the delivery mechanism, and there can be one or more Location Identifiers for one IPMP Tool. The IPMP Tool management function will use each location identifier when attempting to retrieve a particular TPMP Tool. If the IPMP Tool management function succeeds in finding the necessary IPMP Tool using the first location identifier in IPMP Tool Information A 211, it does not attempt to retrieve the IPMP Tool using the second location identifier. If retrieval is unsuccessful using the first location identifier, it searches for the IPMP Tool using the second location identifier. This sequence continues until the IPMP Tool is retrieved or all location identifiers have been tried.

Location identifiers can identify a local address or an external address. Local tool locations could be internal to the terminal system or a peripheral device accessible to the terminal system. External tool locations can be any address external to and accessible by the terminal system, including http or ftp locations on the Internet.

The IPMP Tool identifier has two parts: a location type and location details. The location type is any one type shown in the following Table 2. The correlation between location type and location details is as shown in Table 2.

TABLE 2

Location types and details

| Location Type | Location Details |
| --- | --- |
| Local | N/A |
| Peripherals | N/A |
| Remote: downloadable | Website (http, ftp . . . ) |
| Remote: non-downloadable | Remote location of Java servlet, etc . . . |
| Inside Content Stream | This part should contain the IPMP Tool itself |
| . . . | . . . |

"Local" as used in this table indicates a location in the receiving terminal. "Peripheral" includes any device accessible to the receiving terminal either directly or via a LAN. "Remote: downloadable" indicates that the decryption tool can be downloaded from a web site, for example. "Remote: non-downloadable" indicates distributed processing, that is, the encrypted data is sent to a specific web site where it is decrypted and the un-encrypted data is then returned to the terminal. "Inside content stream" means that the decryption tool is embedded in the content stream.

3. IPMP Tool Management Function

The IPMP Tool management function should run before the system decoder. This management function parses the IPMP Tool Information in the first packet of the input content stream, and runs the necessary processes described in detail in this section.

FIG. 3 shows the IPMP Tool management function applied to an IPMP system handling MPEG-4 content streams. The IPMP Tool database 321 shown in FIG. 3 stores all IPMP Tool retrieval results.

The IPMP Tool management function runs the following four operations.

Step 1: Parse the IPMP Tool Information in the first packet of an incoming content stream.

Step 2: Retrieve the necessary IPMP Tools specified in the IPMP Tool Information.

Step 3: Store the retrieval results in the IPMP Tool database 321, which is referenced later by the IPMP system.

Step 4: Pass the input data packets to the demux (demultiplexer) layer. (transparent)

Immediately after receiving a content stream, the IPMP Tool management function looks for the IPMP Tool Information packet flag, which is a unique header in every content stream. If the IPMP Tool Information Packet flag is not found, processing jumps forward to step 4 and all data is simply passed to the demux layer. If the flag is found, operation continues from step 2.

In step 2 the IPMP Tool management function reads the location identifier type and location identifier details and tries to retrieve the IPMP Tool. If there are plural identifiers associated with one IPMP Tool, the IPMP Tool is first retrieved using location identifier 1. If retrieval fails, retrieval is attempted again using location identifier 2. Each time retrieval succeeds, the retrieval result is stored to the IPMP Tool database 321 (step 3) and control then loops back to step 2 until all IPMP Tools have been retrieved.

If the location identifier type is "local," the IPMP Tool management function searches the current local terminal using the specified IPMP Tool name or IPMP Tool identifier, and stores the retrieval result in the IPMP Tool database 321 if the IPMP Tool is found.

If the location identifier type is "peripheral," the IPMP Tool management function searches all accessible peripheral devices using the specified IPMP Tool name or IPMP Tool identifier, and stores the retrieval result in the IPMP Tool database 321 if the IPMP Tool is found.

If the location identifier type is "remote: downloadable," the IPMP Tool management function connects to the specified remote address, downloads the IPMP Tool using the specified IPMP Tool name or IPMP Tool identifier, and stores the retrieval result in the IPMP Tool database 321 if downloading is successful.

If the location identifier type is "remote: non-downloadable," the IPMP Tool management function simply stores the remote address in the IPMP Tool database 321.

If the location identifier type is "inside content stream," the IPMP Tool management function simply stores the binary stream (such as to a file) and allocates an IPMP Tool name to the stored entity. The retrieval result is stored to the IPMP Tool database 321. There are four entities in the IPMP Tool database 321, and an example is shown in Table 3.

TABLE 3

Four entities in the IPMP Tool database

| Content ID | IPMP Tool ID | IPMP Tool Name | IPMP Tool Location |
| --- | --- | --- | --- |
| 0000000011000100 | 00101001 | DESDecrypt.dll | C:\ipmptools\DesDecrypt.dll |
| 0000000011000100 | 00100110 | HardKey | LPT1 |
| 0000000011000100 | 00100010 | JavaServlet1 | 10.2.3.1/servlet1 |

Figure 4:
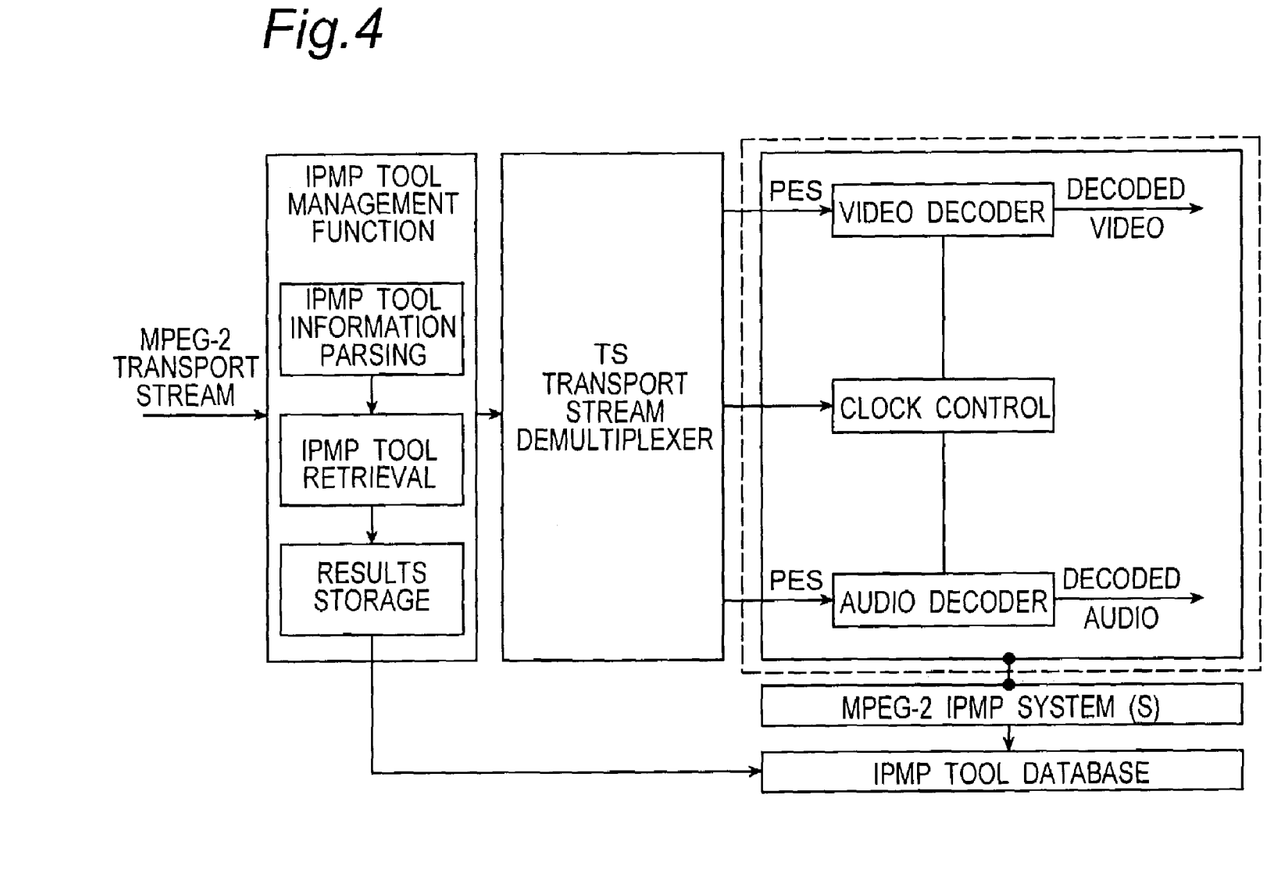
FIG. 4 shows how the IPMP Tool management function works with an MPEG-2 system.

When it is necessary to generate an instance of a particular IPMP Tool, the IPMP system references this IPMP Tool database to find the location of a specific IPMP Tool using the tool ID, tool name, or the current Content ID as necessary. The architecture including this IPMP Tool management function and IPMP Tool database can be applied to any MPEG system, and an implementation of this IPMP Tool management function to an MPEG-2 IPMP system is shown in FIG. 4. The part within the dashes in FIG. 4 corresponds to the part within the dotted line in FIG. 3.

4. Output Required From User Authentication

Figure 8:
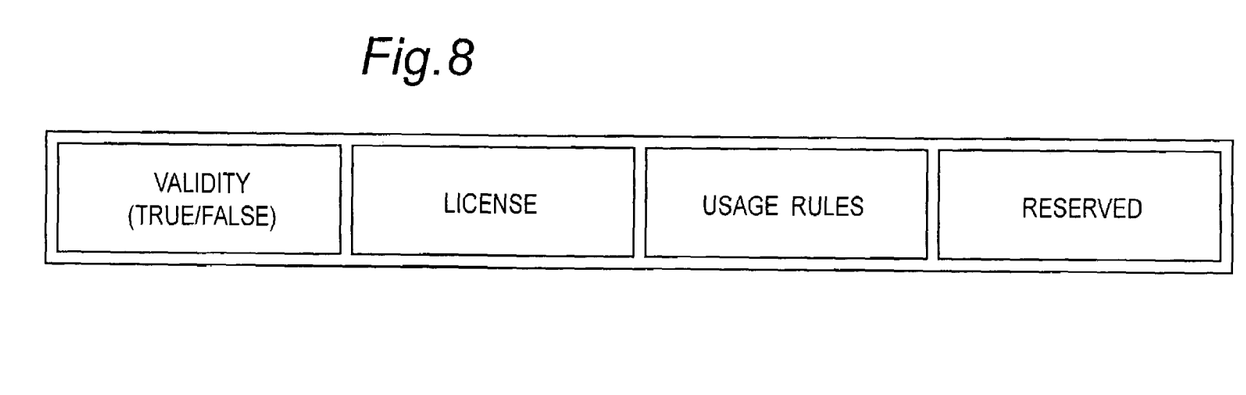
FIG. 8 shows the format of the authentication result.

Although it is not recommended to standardize the user authentication method, it is necessary to standardize the authentication results. Authentication results must pass through an MPEG-n IPMP system to enable authorized use of the protected contents. Our invention standardizes authentication results according to specific rules using a format having at least three fields as shown in FIG. 8.

The validity flag indicates whether the user (terminal) is valid, and the result is recorded as a true or false flag.

The usage rules contain details relating to user access to content (such as whether playback is permitted only once or some multiple number of times).

The license field is described in detail below. It is known that the content is scrambled and the scramble key is embedded in the content stream (such as in the IPMP elementary steam (ES) in MPEG-4). It is also possible to employ a two-layer security system that further encrypts the scramble key in order to improve security. The second layer key that is used to decrypt the scramble key for the scrambled content is called a "license". Having the correct license is the minimum condition required to use protected content. A license should be retrieved from a License Server via a secure channel during the nonstandard user authentication process.

Figure 5:
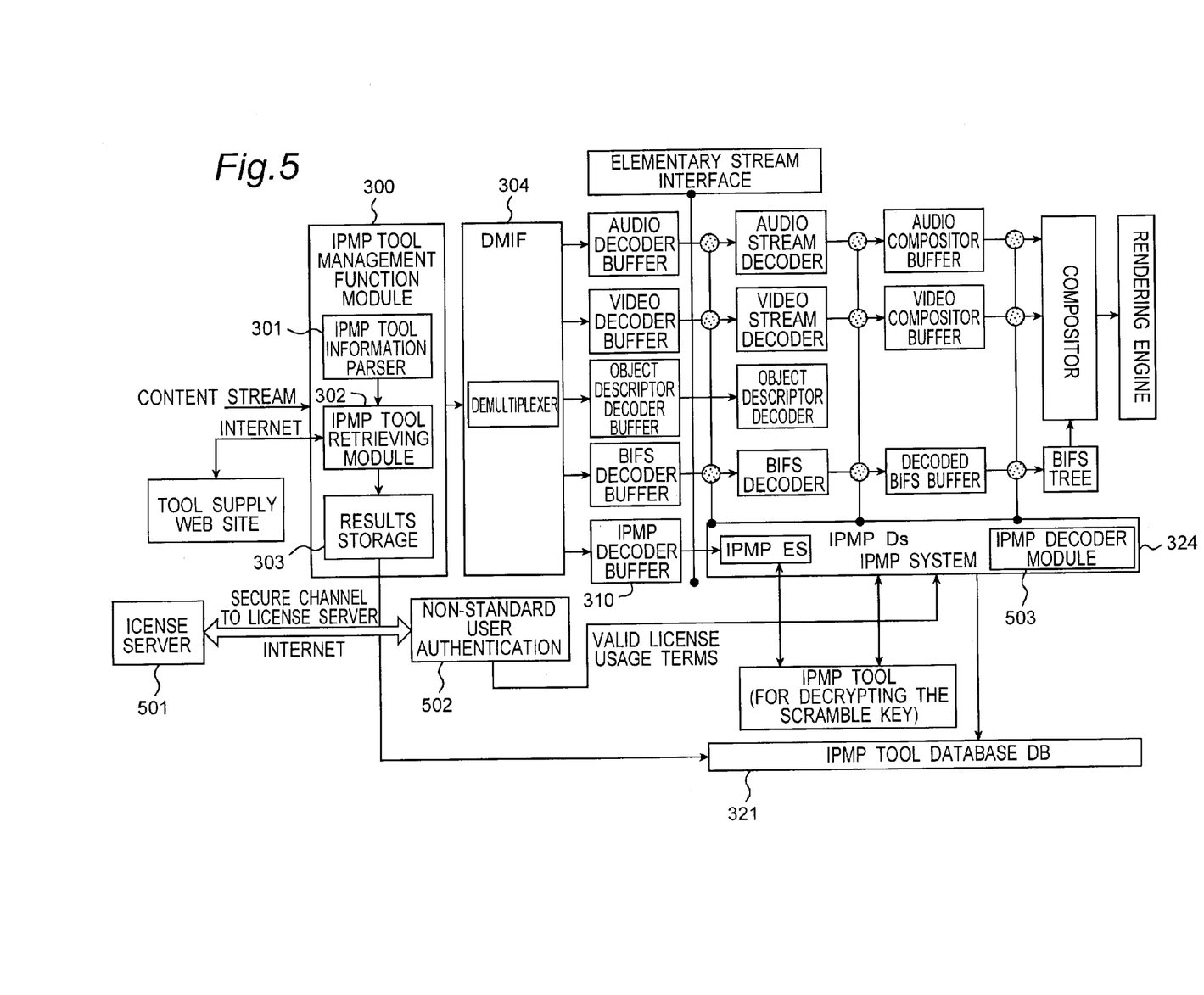
FIG. 5 shows how the user authentication module works with an MPEG-4 IPMP system and IPMP Tool management function module.

The proposal of this invention for a two-layer security system is based on an MPEG La Baule meeting "Proposal on the Renewability of IPMP system" (M6473), and our invention introduces an additional user authentication layer on top of these two layers for improved security. Regardless of the user authentication method used by the IPMP terminal, the above-noted authentication result must be determined and reported during user authentication. As shown in FIG. 5, a user authentication module working together with the MPEG-4 IPMP system requests a content agent to issue a user license after user authentication is completed.

Figure 6:
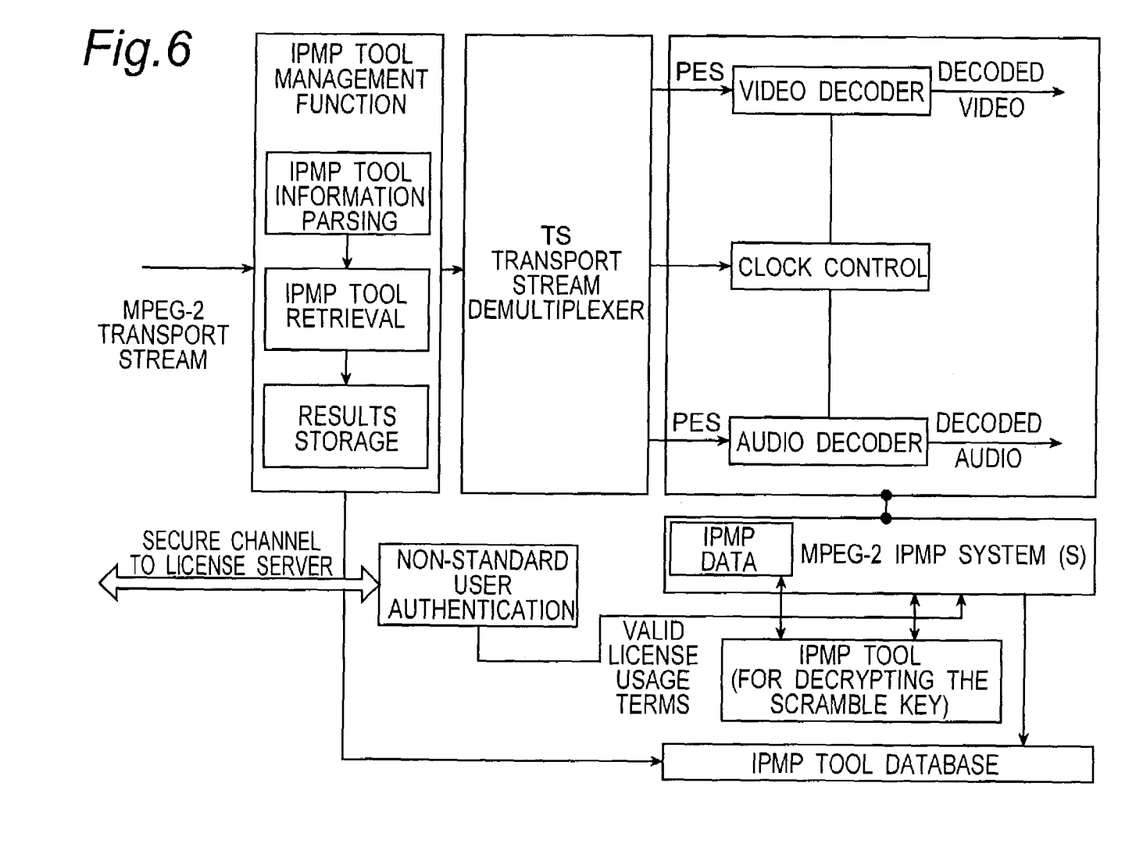
FIG. 6 shows how the user authentication module works with an MPEG-2 system and IPMP Tool management function module.

It should be noted that the same 2-layer security solution can be realized for an MPEG-n IPMP system as shown in FIG. 6.

Referring to FIG. 5, the decryption software is retrieved by the IPMP Tool retrieving module 302 over the Internet, stored temporarily by the results storage 303, and then written to IPMP Tool database 321. The decryption program cannot be run until the required decryption key for opening the decryption software is retrieved. The decryption key for decrypting the decryption software is detected by the IPMP Tool Information parser 301 from the content stream while still encrypted. The encrypted decryption key is passed through the demultiplexer interface 304 and IPMP decoder buffer 310 to the IPMP system 324. The license key is sent via the Internet from a license server 501. After user authentication using non-standard user authentication 502, the license key is sent to the IPMP system 324. The IPMP system 324 also has an IPMP decoder module 503. The IPMP decoder module 503 decrypts the encrypted decryption key using the license key to generate the decryption key. This decryption key can then be used to run the decryption program.

IPMP System Profiles

Different applications, different terminals, and different vendors will have different IPMP System requirements, and it is difficult to cover all such requirements in one single standard. Basically this issue comes from whether the IPMP Tool is pre-loaded or downloadable. Typical hardware implementations have most of these tools pre-loaded or built-in, but many set-top boxes are also able to download the necessary tools. Mobile or portable terminals typically have rather simple hardware implementations, and therefore require precoded IPMP Tools. Computer applications are very flexible and tools can be either downloadable or pre-coded.

By defining three profiles as shown in Table 4 covering three typical types of terminals, that is, relatively simple portable terminals, complex set-top box terminals, and flexible personal computer terminals, IPMP Tools can be provided for any IPMP system implementation.

TABLE 4

Three profiles for different terminal types

| IPMP Tool retrieval | Portable Terminal Simple Profile | Set-Top-Box Terminal Core Profile | PC Terminal High Profile |
|---|---|---|---|
| Pre-coded | Yes | Yes | Yes |
| Downloadable | No (for most cases) | Yes (for some cases) | Yes |

If the tool is pre-coded in the terminal, it is necessary to define what types of IPMP Tools are recommended or approved standard tools in order for the terminal manufacturer to provide a specific implementation in the terminal. The advantage of implementing the innovative elements of the present invention are described below.

First, the IPMP Tool Information definition of this invention makes it clear where and how the location identifiers and other necessary IPMP Tool related information are to be stored.

Furthermore, by introducing the above-described IPMP Tools management function and IPMP Tools Information, the invention solves the problem of unpredictable delays occurring when a new IPMP Tools needs to be retrieved while the content is being used. As shown in FIG. 3 and FIG. 5, all IPMP Tools needed to use the entire content stream are retrieved and properly stored before the demultiplexing process. This also enables a clean, systematic IPMP implementation. Furthermore, this IPMP Tool management function and IPMP Tool Information meet the requirements of intellectual property management and protection under the MPEG standard, and function with all MPEG-n models.

It will be further noted that user authentication results are clearly defined by the present invention even when a non-standard method is used for user authentication. A two-layer security decryption means for IPMP is also proposed for improved security. As shown in FIG. 6, the proposed decryption means is also applicable to any MPEG-n IPMP system.

Yet further, by defining three profiles for three possible terminal types, IPMP terminals can be clearly categorized and a path is laid for standardizing future IPMP extensions.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A content distribution method for distributing content from a plurality of content providers, comprising:
   encoding and converting content to a content stream;
   encrypting the encoded content stream using a data encryption tool;
   generating a specific Content ID according to the content;
   generating intellectual property management and protection (IPMP) Tool Information containing information needed to decrypt content encrypted by the data encryption tool;
   generating an IPMP Tool Information flag indicating the presence of the IPMP Tool Information;
   compiling a data stream from the IPMP Tool Information flag, the IPMP Tool Information, the specific Content ID, and the encrypted content stream; and
   generating separate IPMP Tool Information containing information required to decrypt encrypted content distributed by a second content provider of the plurality of content providers and encrypted using a second data encryption tool,
   wherein the IPMP Tool Information for the content encrypted by a first content provider of the plurality of content providers and the separate IPMP Tool Information for the content encrypted by the second content provider of the plurality of content providers are included in the data stream,
   wherein generating the IPMP Tool Information comprises:
   allocating an IPMP Tool ID from a pre-defined ID table that identifies a plurality of encryption tools used for encrypting each content, said pre-defined ID table defining a list of identifiers of IPMP tools;
   allocating a location type ID indicating the type of location where the data encryption tool is located; and
   allocating location details information indicating the specific location where the data encryption tool is located.

2. A content distribution method according to claim 1, wherein the data encryption tool differs by content unit.

3. A content distribution method according to claim 1, wherein the data encryption tool is encrypted with an encryption key.

4. A content distribution method according to claim 3, wherein the encryption is further encrypted with a license key.

5. A content distribution method according to claim 1, further comprising embedding digital watermark information in the content.

6. A content distribution method according to claim 5, wherein information required to read the digital watermark information embedded in the content is included in the IPMP Tool Information.

7. A content distribution method according to claim 1, wherein the second data encryption tool used to encrypt the content encrypted by the second content provider is distinct from the data encryption tool used to encrypt the content encrypted by the first content provider.

8. A method for reading content in a terminal receiving a data stream containing content distributed from a plurality of content providers comprising:
   parsing a data stream;
   detecting an Intellectual Property Management and Protection (IPMP) Tool Information flag, Content ID, and a plurality of IPMP Tool information;
   retrieving a first IPMP Tool required to decrypt content encrypted by a first content provider of the plurality of content providers in the data stream, based on the detected plurality of IPMP Tool Information; and
   retrieving a second IPMP Tool required to decrypt content encrypted by a second content provider of the plurality of content providers in the data stream, based on the detected plurality of IPMP Tool Information,
   wherein retrieving the first IPMP Tool comprises:
   identifying from the IPMP Tool ID a decryption tool for decrypting the encryption used for the content;
   detecting from a location type identifier a type of location where the decryption tool is located; and
   identifying specifically and accessing the location where the decryption tool is located from location details information.

9. A method for reading content according to claim 8, wherein the IPMP Tool is a decryption tool for decrypting content encryption.

10. A method for reading content according to claim 9, wherein the decryption tool differs by content unit.

11. A method for reading content according to claim 9, wherein the decryption tool is encrypted with an encryption key.

12. A method for reading content according to claim 11, wherein the decryption key for decrypting the encryption key is further encrypted with a license key.

13. A method for reading content according to claim 8, wherein retrieving the first IPMP Tool uses a table containing a plurality of IPMP Tool IDs and information identifying a specific decryption tool for each IPMP Tool.

14. A method for reading content according to claim 13, wherein the table is stored by both a content provider and the terminal.

15. A method for reading content according to claim 8, wherein retrieving the first IPMP Tool includes encoding an IPMP Tool already stored in a terminal.

16. A method for reading content according to claim 8, wherein retrieving the first IPMP Tool includes downloading on-line from a specific tool supplier.

17. A method for reading content according to claim 8, further comprising reading a digital watermark embedded in the content.

18. A method for reading content according to claim 17, wherein the IPMP Tool is a tool for decrypting a digital watermark.

19. A method for reading content according to claim 8, wherein the interface for IPMP Tool communication is compliant with an interface required by the terminal.

20. A content distribution method for distributing content from a plurality of content providers according to claim 1, wherein the encrypting encrypts the content stream in part.

21. An apparatus for distributing content from a first content provider of a plurality of content providers, comprising:
encoding arrangement which encodes and converts content to a content stream;
encryption arrangement which encrypts the encoded content stream using a data encryption tool;
a Content ID generating arrangement which generates a specific Content ID according to the content;
an IPMP (intellectual property management and protection) Tool Information generating arrangement which generates IPMP Tool Information containing the information needed to decrypt a content stream encrypted by the data encryption tool;
a generating arrangement which generates an IPMP Tool Information flag indicating the presence of IPMP Tool Information; and
a data stream compiler which compiles a data stream from the IPMP Tool Information flag and following IPMP Tool Information, Content ID, and encrypted content stream,
wherein the IPMP Tool Information generating arrangement comprises:
an allocator that allocates an IPMP Tool ID from a pre-defined ID table that identifies a plurality of decryption tools used for decrypting each content, said pre-defined ID table defining a list of identifiers of IPMP tools, to allocate a location type ID indicating the type of location where the decryption tool is located, and to allocate location details information indicating the specific location where the decryption tool is located,
wherein the IPMP Tool Information for content encrypted by a first content provider of the plurality of content providers and a separate IPMP Tool Information for content encrypted by a second content provider of the plurality of content providers are included in the data stream for transmission to a terminal apparatus.

22. A terminal apparatus for receiving a data stream containing content from a plurality of content providers and reading the content, comprising:
a parsing arrangement which parses the data stream;
a detection arrangement which detects an Intellectual Property Management and Protection IPMP Tool Information flag, Content ID, and a plurality of IPMP Tool Information; and
a retrieving arrangement which retrieves a first IPMP Tool, required to decrypt content encrypted by a first content provider of the plurality of content providers, in the data stream, based on the detected plurality of IPMP Tool Information and which retrieves a second IPMP tool required to decrypt content encrypted by a second content provider of the plurality of content providers, in the data stream, based on the detected plurality of IPMP Tool Information,
wherein retrieving the first IPMP Tool comprises:
identifying from the IPMP Tool ID a decryption tool for decrypting the encryption used for the content;
detecting from a location type identifer a type of location where the decryption tool is located; and
identifying specifically and accessing the location where the decryption tool is located from location details information.

* * * * *

UNITED STATES PATENT AND TRADEMARK OFFICE
CERTIFICATE OF CORRECTION

PATENT NO. : 7,689,823 B2  Page 1 of 1
APPLICATION NO. : 10/297622
DATED : March 30, 2010
INVENTOR(S) : S. Shen et al.

It is certified that error appears in the above-identified patent and that said Letters Patent is hereby corrected as shown below:

On cover page 2 under Foreign Patent Documents, (column 1, line 25) of the printed patent, delete "JP 8-331543".

On cover page 2 under Foreign Patent Documents, (column 1, line 32) of the printed patent, delete "JP 11-331310".

On cover page 2 under Foreign Patent Documents, (column 1, line 36) of the printed patent, delete "JP 2000-101853".

On cover page 2 under Foreign Patent Documents, (column 1 line 41) of the printed patent, delete "JP 2000-287206".

On cover page 2 under Other Publications, (column 2, line 37) of the printed patent, delete "JP 2000-287206".

On cover page 2 under Other Publications, (column 2, line 38) of the printed patent, delete "JP 10-257046".

On cover page 2 under Other Publications, (column 2, line 39) of the printed patent, delete "JP 11-331310".

On cover page 2 under Other Publications, (column 2, line 41) of the printed patent, delete "JP 8-331543".

On cover page 2 under Other Publications, (column 2, line 42) of the printed patent, delete "JP 2000-101853".

Signed and Sealed this

Fifth Day of October, 2010

David J. Kappos
*Director of the United States Patent and Trademark Office*